US011935472B2

(12) United States Patent
Ji et al.

(10) Patent No.: US 11,935,472 B2
(45) Date of Patent: Mar. 19, 2024

(54) PIXEL SENSING CIRCUIT AND DISPLAY DRIVER INTEGRATED CIRCUIT

(71) Applicant: LX Semicon Co., Ltd., Daejeon (KR)

(72) Inventors: Seung Hwan Ji, Daejeon (KR); Sang Min Lee, Daejeon (KR); Gi Baek Choi, Daejeon (KR); Jung Bae Yun, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/764,932

(22) PCT Filed: Sep. 28, 2020

(86) PCT No.: PCT/KR2020/013190
§ 371 (c)(1),
(2) Date: Mar. 29, 2022

(87) PCT Pub. No.: WO2021/066444
PCT Pub. Date: Apr. 8, 2021

(65) Prior Publication Data

US 2022/0366850 A1 Nov. 17, 2022

(30) Foreign Application Priority Data

Sep. 30, 2019 (KR) ........................ 10-2019-0120604

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2310/0291* (2013.01); *G09G 2320/0295* (2013.01); *G09G 2330/12* (2013.01)

(58) Field of Classification Search
CPC ............... G09G 3/3233; G09G 3/3291; G09G 2310/0291; G09G 2320/0295; G09G 2330/12
See application file for complete search history.

(56) References Cited

U.S. PATENT DOCUMENTS 9,514,686 B2 12/2016 Lee et al.
2016/0086539 A1* 3/2016 Mizukoshi ............... G09G 5/18 345/77
2017/0018249 A1* 1/2017 Lim ..................... G09G 3/3696
(Continued)

FOREIGN PATENT DOCUMENTS

CN 108091299 A 5/2018
JP 4465183 B2 5/2010
KR 10-0597037 B1 7/2006
(Continued)

OTHER PUBLICATIONS

Korean Office Action dated Aug. 22, 2023 issued in Patent Application No. 10-2019-0120604 (6 pages).
(Continued)

*Primary Examiner* — Kenneth B Lee, Jr.
(74) *Attorney, Agent, or Firm* — POLSINELLI PC

(57) ABSTRACT

The present disclosure relates to a pixel sensing circuit which extends an operation section of an integrator by using an additional signal and allows securing a time required for a stable output of a sensing voltage.

15 Claims, 8 Drawing Sheets

(56) References Cited

U.S. PATENT DOCUMENTS

| | | | | |
|---|---|---|---|---|
| 2017/0148385 | A1 | 5/2017 | Kishi | |
| 2018/0120991 | A1* | 5/2018 | Kang | G06F 3/04184 |

FOREIGN PATENT DOCUMENTS

| | | | |
|---|---|---|---|
| KR | 2013-0024744 | A | 3/2013 |
| KR | 2015-0078360 | A | 7/2015 |
| KR | 2016-0094129 | A | 8/2016 |
| KR | 2017-0008558 | A | 1/2017 |
| KR | 2017-0051782 | A | 5/2017 |
| KR | 2017-0052606 | A | 5/2017 |
| KR | 2017-0064162 | A | 6/2017 |
| KR | 2017-0072420 | A | 6/2017 |
| KR | 2017-0072421 | A | 6/2017 |
| KR | 2018-0065678 | A | 6/2018 |
| KR | 2019-0030060 | A | 3/2019 |
| KR | 2019-0059674 | A | 5/2019 |

OTHER PUBLICATIONS

Chinese Office Action dated Sep. 16, 2023 issued in Patent Application No. 202080062378.8 (9 pages).

Korean Notice of Allowance, dated Oct. 31, 2023 issued in Patent Application No. 10-2019-0120604 (2 pages).

* cited by examiner

PIXEL SENSING CIRCUIT AND DISPLAY DRIVER INTEGRATED CIRCUIT

CROSS-REFERENCE TO RELATED APPLICATION

This application is a national stage entry of PCT/KR2020/013190 filed Sep. 28, 2020 which claims priority from Korean Patent Application No. 10-2019-0120604 filed on Sep. 30, 2019 in the Korean Intellectual Property Office, the disclosure of which is herein incorporated by reference in their entirety. In addition, this application claims priority in countries other than the Circuited States for the same reason, and disclosure of which is herein incorporated by reference in its entirety.

TECHNICAL FIELD

The present disclosure relates to a technique for testing a pixel sensing circuit.

BACKGROUND ART

The display device may include a source driver for driving pixels disposed on the panel.

The source driver determines a data voltage according to image data, and controls the brightness of each pixel by supplying the data voltage to the pixels.

Meanwhile, even if the same data voltage is supplied, the brightness of each pixel may vary according to the characteristics of the pixels. For example, each pixel includes a driving transistor, and when a threshold voltage of the driving transistor is changed, the brightness of the pixel may be changed even if the same data voltage is supplied. If the source driver does not consider the characteristic changes of these pixels, the driven pixels have an undesired brightness, and degraded image quality. Smudges on a screen are an example of poor image quality.

In order to improve the poor image quality, the display device may include a pixel sensing circuit for sensing characteristics of pixels.

The pixel sensing circuit may receive an analog signal for each pixel through a sensing line connected to each pixel. Then, the pixel sensing circuit converts the analog signal into pixel sensing data and transmits it to a timing controller, and the timing controller identifies the characteristics of each pixel through the pixel sensing data. In addition, the timing controller may compensate for image data by reflecting characteristics of each pixel, thereby improving the problem of image quality degradation due to pixel deviation.

Meanwhile, since the pixel sensing circuit is designed to operate only in a sensing section, the operating range thereof may be limited. For accurate sensing, the output voltage for pixel sensing is required to be stabilized within the sensing section. However, sometimes the sensing section is short, so that there may be insufficient time for enough sensing. If the output voltage is not stabilized in the sensing section, an error may occur in the sensing because the unstable output voltage before stabilization is used for sensing.

Further, if the output voltage for pixel sensing is not stabilized within the sensing section, it is necessary to increase the operating range of the pixel sensing circuit. That is, this may mean that the sensing section is increased. When the sensing section is increased, the output voltage used for sensing is sufficiently stabilized, and thus accurate sensing may be possible. However, increasing the sensing section may mean reducing a display section of the panel in one frame or reducing a frame rate. The reduction in the display section or frame rate may cause problems such as degradation in image quality. Especially in the case of OLED (Organic Light Emitting Diode) panel, the operating range of the pixel sensing circuit may be further reduced as the load by the pixels increases and the display speed increases.

DETAILED DESCRIPTION OF THE INVENTION

Technical Problem

In view of the above, the present disclosure provides a technique for extending an operating range of a pixel sensing circuit through an additional signal defining an operation of an integrator.

Further, the present disclosure provides a technique for adjusting the degree of extension of the operating range of the pixel sensing circuit by adjusting the additional signal defining the operation of the integrator.

Technical Solution

In accordance with one embodiment, there is provided a circuit for sensing characteristics of a pixel disposed on a display panel, comprising: an integrator for integrating a current of the pixel, wherein the integrator receives a first operation signal and integrates the current of the pixel in an operation section set by the first operation signal, and wherein the integrator receives a second operation signal before receiving the first operation signal and starts operating in a preliminary operation section set by the second operation signal.

In the circuit, the second operation signal may set the preliminary operation section at a preceding time of the operation section by the first operation signal and the integrator may start operating in the preliminary operation section by the second operation signal.

In the circuit, the integrator may output a voltage corresponding to characteristics of a pixel and the voltage may be saturated to a predetermined voltage in the operation section by the first operation signal.

In the circuit, the voltage may be delayed and output over the operation section by the first operation signal and the preliminary operation section by the second operation signal. In the circuit, the operation section by the first operation signal may be set to correspond to a sensing section in which the pixel is sensed.

In the circuit, the preliminary operation section by the second operation signal may be set to correspond to a part of a display section in which the pixel outputs image data.

In the circuit, the first operation signal and the second operation signal may be included in a data control signal that is generated by a data processing circuit and controls to the supply of a data voltage to the pixel.

In the circuit, the first operation signal may be included in a data control signal that is generated by a data processing circuit and controls the supply of a data voltage to the pixel, and the second operation signal may be generated independently of the data control signal.

In the circuit, the integrator may comprise an amplifier which is turned on when receiving the second operation signal and maintained in a turn-on state during the operation section by the first operation signal and the preliminary operation section by the second operation signal.

In accordance with another embodiment, there is provided a display driving integrated circuit comprising: a data driving circuit which identifies a display section by a first operation signal to divide one frame into a display section and a sensing section and supplies a data voltage to a data line connected to a pixel in the display section; and a pixel sensing circuit which senses characteristics of the pixel in the sensing section, wherein the pixel sensing circuit starts operating for a sensing at a time point earlier than a starting point of the sensing section by a predetermined time.

In the display driving integrated circuit, the pixel sensing circuit may start driving one internal circuit according to a second operation signal indicating the time point earlier by the predetermined time.

In the display driving integrated circuit, the pixel sensing circuit may comprise in the one internal circuit one amplifier constituting an integrator or a buffer and start driving the one amplifier according to the second operation signal.

In the display driving integrated circuit, the pixel sensing circuit may start driving the one internal circuit according to the second operation signal, wherein the one internal circuit is connected with the pixel in the sensing section according to the first operation signal.

In the display driving integrated circuit, the second operation signal may be generated according to a time delay of the first operation signal.

In the display driving integrated circuit, the pixel sensing circuit may convert a sensing value of the pixel saturated in the sensing section into sensing data and outputs the sensing data, and the data driving circuit receives image data compensated according to the sensing data, converts the image data into the data voltage, and supplies the data voltage to the data line.

Effects of the Invention

As described above, according to the present embodiment, by extending the operating range of the pixel sensing circuit, a stable sensing voltage can be output and a sensing error can be reduced.

Further, according to the present embodiment, by extending the operating range of the pixel sensing circuit, a sensing time required for a stable output of a sensing voltage can be secured or shortened.

In addition, according to the present embodiment, by minimizing the sensing time, it is possible to secure a display time and improve the degradation of image quality.

MODE FOR IMPLEMENTING THE INVENTION

Figure 1:
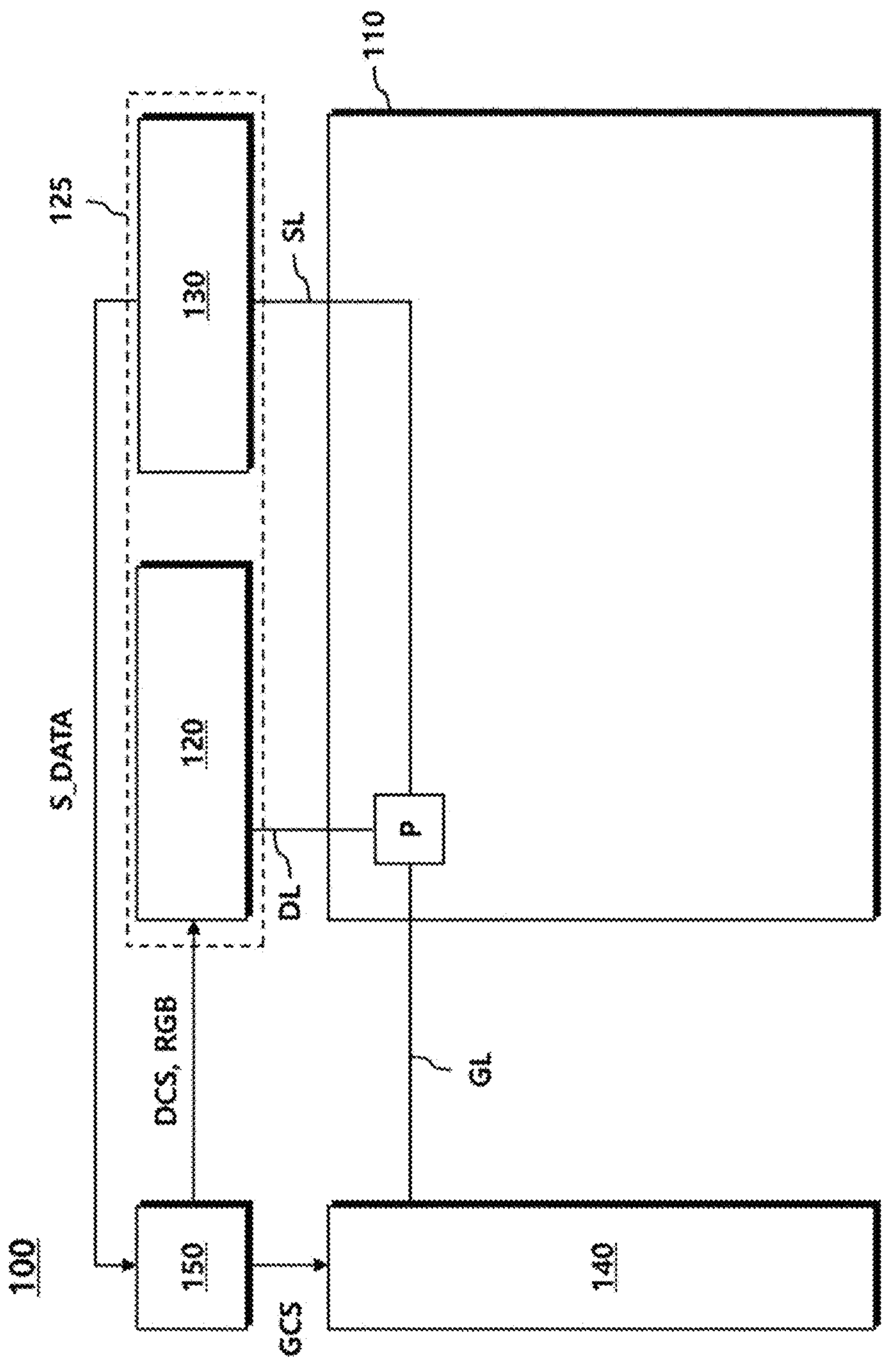
FIG. 1 is a block diagram of a display device according to one embodiment.

Hereinafter, some embodiments of the present disclosure will be described in detail with reference to exemplary drawings. With regard to the reference numerals of the components of the respective drawings, it should be noted that the same reference numerals are assigned to the same components even though they are shown in different drawings. In addition, in describing the present disclosure, a detailed description of a well-known configuration or function related to the present disclosure, which may obscure the subject matter of the present disclosure, will be omitted.

In addition, terms, such as “first”, “second”, “A”, “B”, “(a)”, “(b)”, or the like, may be used in describing the components of the present disclosure. These terms are intended only for distinguishing a corresponding component from other components, and the nature, order, or sequence of the corresponding component is not limited to the terms. In the case where a component is described as being “coupled”, “combined”, or “connected” to another component, it should be understood that the corresponding components may be directly coupled or connected to each other or that the corresponding components may also be “coupled”, “combined”, or “connected” to each other via another component provided therebetween.

FIG. 1 is a block diagram of a display device according to one embodiment.

Referring to FIG. 1, the display device 100 may include a panel 110 and panel driving circuits 120, 130, 140, and 150 for driving the panel 110.

A plurality of data lines DL, a plurality of gate lines GL, and a plurality of sensing lines SL may be disposed on the panel 110 and a plurality of pixels P may be disposed on the panel 110.

The circuits 120, 130, 140, and 150 for driving at least one component included in the panel 110 may be referred to as a panel driving circuit. For example, a data driving circuit 120, a pixel sensing circuit 130, a gate driving circuit 140, and a data processing circuit 150 may be referred to as the panel driving circuit.

Each of the circuits 120, 130, 140, 150 described above may be referred to as the panel driving circuit, and all or a plurality of circuits may be referred to as the panel driving circuit.

In the panel driving circuit, the gate driving circuit 140 may supply a scan signal of a turn-on voltage or a turn-off voltage to the gate line GL. When the scan signal of the turn-on voltage is supplied to the pixel P, the corresponding pixel P is connected to the data line DL, and when the scan signal of the turn-off voltage is supplied to the pixel P, the corresponding pixel (P) and the data line DL is disconnected.

In the panel driving circuit, the data driving circuit 120 supplies a data voltage to the data line DL. The data voltage supplied to the data line (DL) is transferred to the pixel P connected to the data line DL according to the scan signal.

In the panel driving circuit, the pixel sensing circuit 130 receives analog signals (e.g., voltage, current, etc.) formed in each pixel P. The pixel sensing circuit 130 may be connected to each pixel P according to the scan signal, or may be connected to each pixel P according to a separate sensing signal. In this case, the separate sensing signal may be generated by the gate driving circuit 140.

In the panel driving circuit, the data processing circuit 150 may supply various control signals to the gate driving circuit 140 and the data driving circuit 120. The data processing circuit 150 may generate a gate control signal GCS for starting a scan according to timing implemented in each frame and transmit it to the gate driving circuit 140. In addition, the data processing circuit 150 may output image data RGB, which is converted from external input image data according to a data signal format used in the data driving circuit 120, to the data driving circuit 120. Further, the data processing circuit 150 may transmit a data control signal DCS for controlling the data driving circuit 120 to supply a data voltage to each pixel P according to each timing.

The data processing circuit 150 may compensate and transmit the image data RGB according to the characteristics of the pixel P. In this case, the data processing circuit 150 may receive the sensing data S_DATA from the pixel sensing circuit 130. The sensing data S_DATA may include a measurement value for the characteristic of the pixel P.

Meanwhile, the data driving circuit 120 may be referred to as a source driver. And, the gate driving circuit 140 may be referred to as a gate driver. Further, the data processing circuit 150 may be referred to as a timing controller. The data driving circuit 120 and the pixel sensing circuit 130 are included in one integrated circuit 125, which may be referred to as a source driver integrated circuit (IC). In addition, the data driving circuit 120, the pixel sensing circuit 130, and the data processing circuit 150 may be included in one integrated circuit, which may be referred to as an integrated IC. Although the present embodiment is not limited to the above terms, descriptions of some commonly known components of the source driver, the gate driver, the timing controller, and the like will be omitted in the following descriptions of the embodiment. Therefore, in understanding the embodiment, it should be considered that the commonly known components are omitted.

Meanwhile, the panel 110 may be an organic light emitting display panel. In this case, the pixels P disposed on the panel 110, may include an organic light emitting diode (OLED) and one or more transistors. The characteristics of the organic light emitting diode OLED and the transistor included in each pixel P may change over time or depending on a surrounding environment. The pixel sensing circuit 130 according to one embodiment may sense characteristics of these components included in each pixel P and transmit them to the data processing circuit 150.

Figure 2:
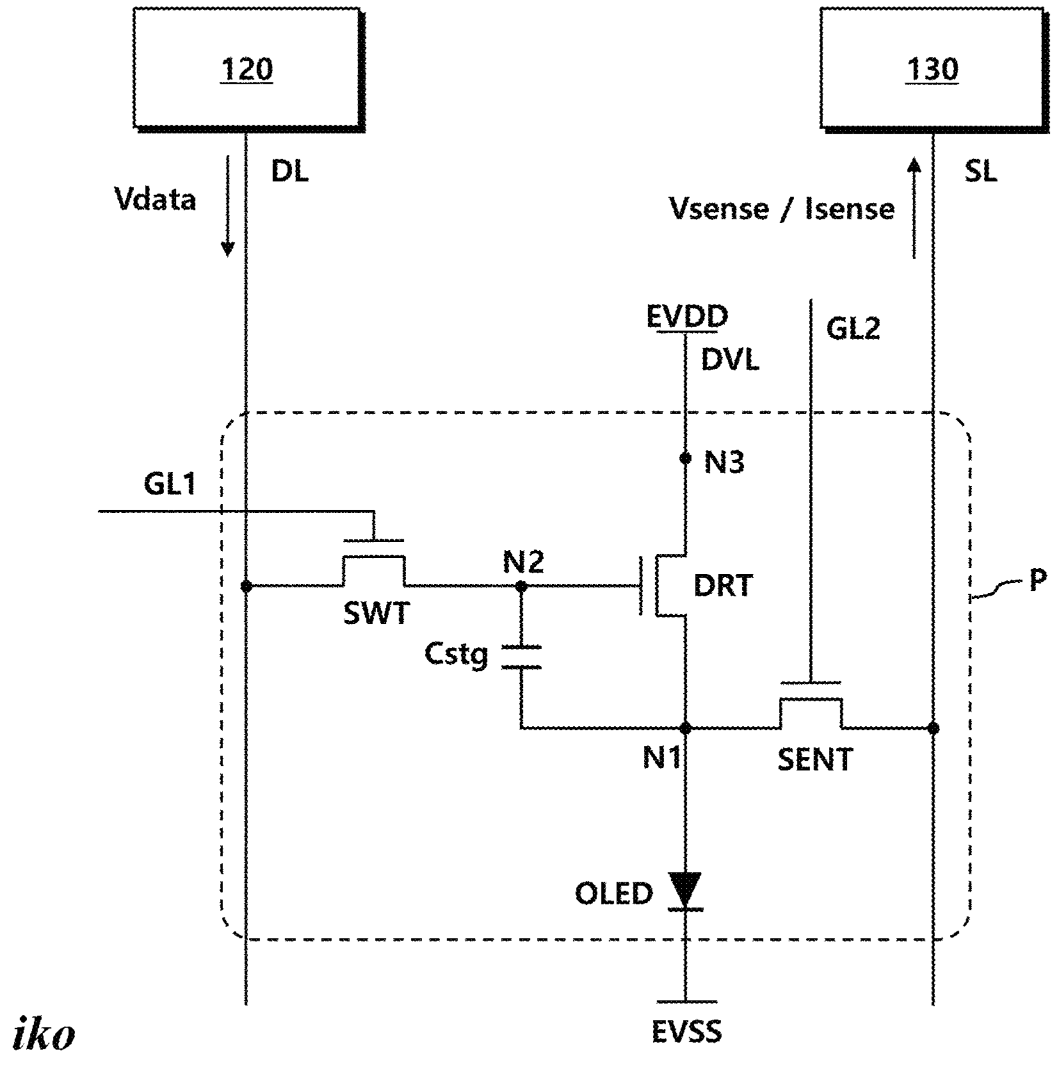
FIG. 2 is a diagram illustrating a structure of a pixel and signals input/output to/from a pixel from/to a data driving circuit and a pixel sensing circuit according to one embodiment.

FIG. 2 is a diagram illustrating a structure of a pixel and signals input/output to/from the pixel from the data driving circuit and the pixel sensing circuit according to one embodiment.

Referring to FIG. 2, the pixel P may include an organic light emitting diode OLED, a driving transistor DRT, a switching transistor SWT, a sensing transistor SENT, and a storage capacitor Cstg.

The organic light emitting diode OLED may include an anode electrode, an organic layer, and a cathode electrode. Under the control of the driving transistor DRT, the anode electrode and the cathode electrode are respectively connected to the driving voltage EVDD and the base voltage EVSS to emit light.

The driving transistor DRT may control the brightness of the organic light emitting diode OLED by controlling the driving current supplied to the organic light emitting diode OLED.

A first node N1 of the driving transistor DRT may be electrically connected to the anode electrode of the organic light emitting diode OLED, and may be a source node or a drain node. A second node N2 of the driving transistor DRT may be electrically connected to a source node or a drain node of the switching transistor SWT, and may be a gate node. A third node N3 of the driving transistor DRT may be electrically connected to the driving voltage line DVL for supplying the driving voltage EVDD, and may be the drain node or the source node.

The switching transistor SWT is electrically connected between the data line DL and the second node N2 of the driving transistor DRT, and may be turned on by receiving a scan signal through the gate lines GL1 and GL2.

When the switching transistor SWT is turned on, the data voltage Vdata supplied from the data driving circuit 120 through the data line DL is transferred to the second node N2 of the driving transistor DRT.

The storage capacitor Cstg may be electrically connected between the first node N1 and the second node N2 of the driving transistor DRT.

The storage capacitor Cstg may be a parasitic capacitor existing between the first node N1 and the second node N2 of the driving transistor DRT, or may be an external capacitor which is intentionally designed outside the driving transistor DRT.

The sensing transistor SENT connects the first node N1 of the driving transistor DRT and the sensing line SL, and the sensing line SL applies a reference voltage Vref to the first node N1. The analog signal (e.g., voltage or current) formed in the first node N1 may be transmitted to the pixel sensing circuit 130.

In addition, the pixel sensing circuit 130 measures the characteristics of the pixel P using the analog signal Vsense or Isense transmitted through the sensing line SL.

Based on the measured voltage of the first node N1, the threshold voltage, mobility, and current characteristics of the driving transistor DRT can be grasped. In addition, based on the measured voltage of the first node N1, the degree of degradation of the organic light emitting diode OLED such as parasitic capacitance and current characteristics of the organic light emitting diode OLED can be grasped.

In addition, by measuring the current transmitted to the first node N1 through the driving transistor DRT, the current capability of the driving transistor DRT can be measured. In addition, by measuring a current flowing through the first node N1 to the organic light emitting diode OLED, the current characteristics of the organic light emitting diode OLED can be measured.

The pixel sensing circuit 130 may measure a current transmitted from or to the first node N1, and transmit the measured value to the data processing circuit 150 (see FIG. 1). In addition, the data processing circuit 150 (see FIG. 1) may analyze the current to identify the characteristics of each pixel P.

Figure 3:
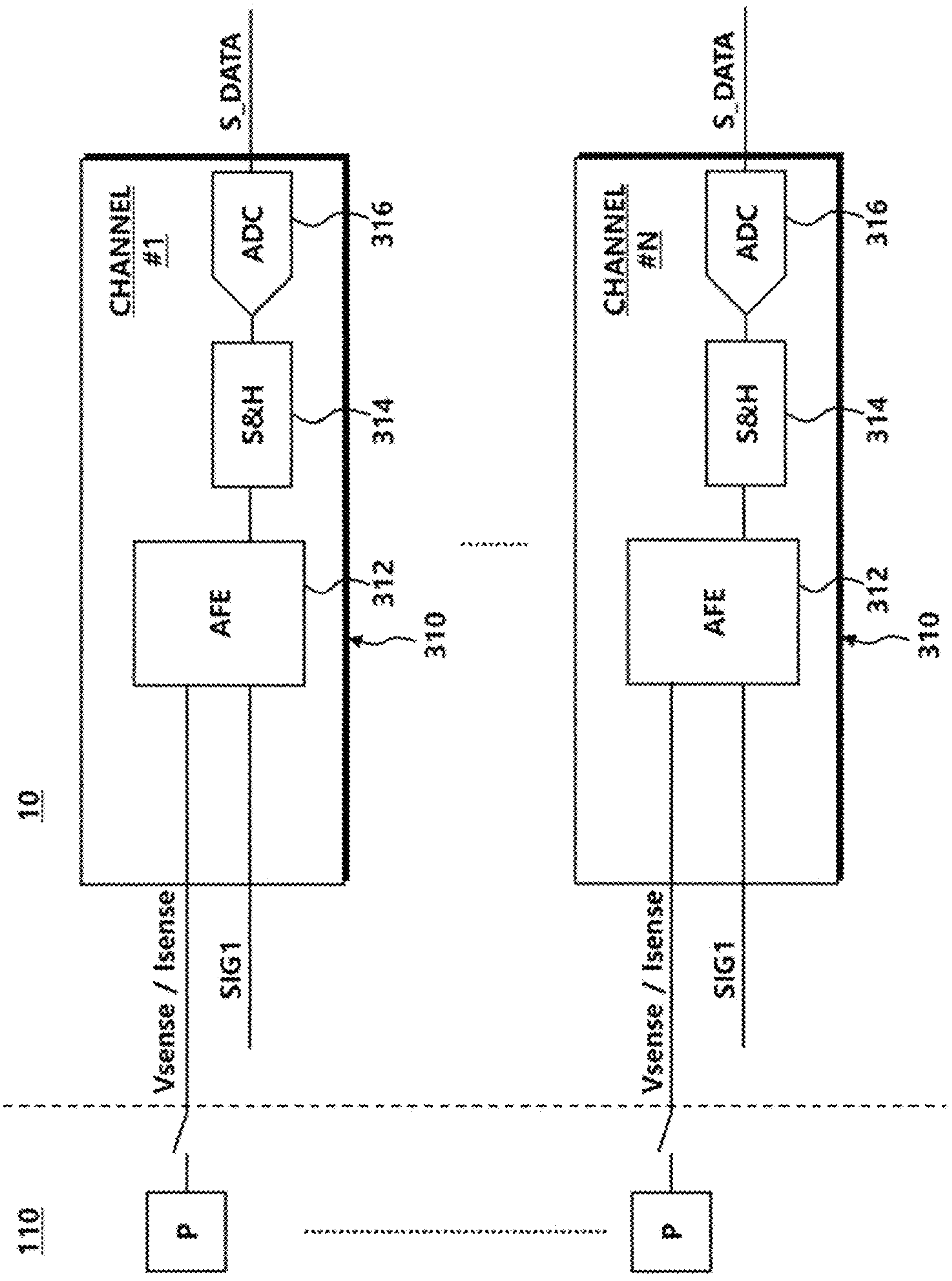
FIG. 3 is a block diagram of a general pixel sensing circuit.

FIG. 3 is a block diagram of a general pixel sensing circuit.

Referring to FIG. 3, the pixel sensing circuit 10 may sense a pixel voltage Vsense or a pixel current Isense transmitted from the pixel P through an analog-to-digital converting circuit 316. In addition, the pixel sensing circuit 10 may transmit sensing data S_DATA corresponding to the sensed pixel current to the data processing circuit.

The pixel sensing circuit 10 may include a plurality of channel circuits 310, and each of the channel circuits 310 may include an analog-front-end (AFE) circuit 312, a sample-and-hold circuit (S&H) 314, and an analog-to-digital converting circuit (ADC) 316.

The analog-front-end circuit 312 may preprocess an analog signal (e.g., voltage or current) transmitted to the input terminal. The analog signal may include a pixel voltage Vsense or a pixel current Isense.

The sample and hold circuit 314 may hold an output signal of the analog-front-end circuit 312 for a predetermined time period. The sample and hold circuit 314 may output the held output signal to the analog-to-digital converting circuit 316 after the predetermined time period has elapsed.

The analog-to-digital converting circuit 316 may convert the output signal of the sample and hold circuit 314 into digital data.

Further, the analog front end circuit 312 may receive a first operation signal SIG1. When receiving the first operation signal SIG1, the analog front end circuit 312 prepares to receive an analog signal (e.g., the pixel current Isense) to be pre-processed. For example, when a current integrator of the analog front end circuit 312 receives the first operation signal SIG1 while being turned off, it may be turned on.

The first operation signal SIG1 may be included in the data control signal DCS which is generated by the data processing circuit 150 to control the supply of the data voltage.

Figure 4:
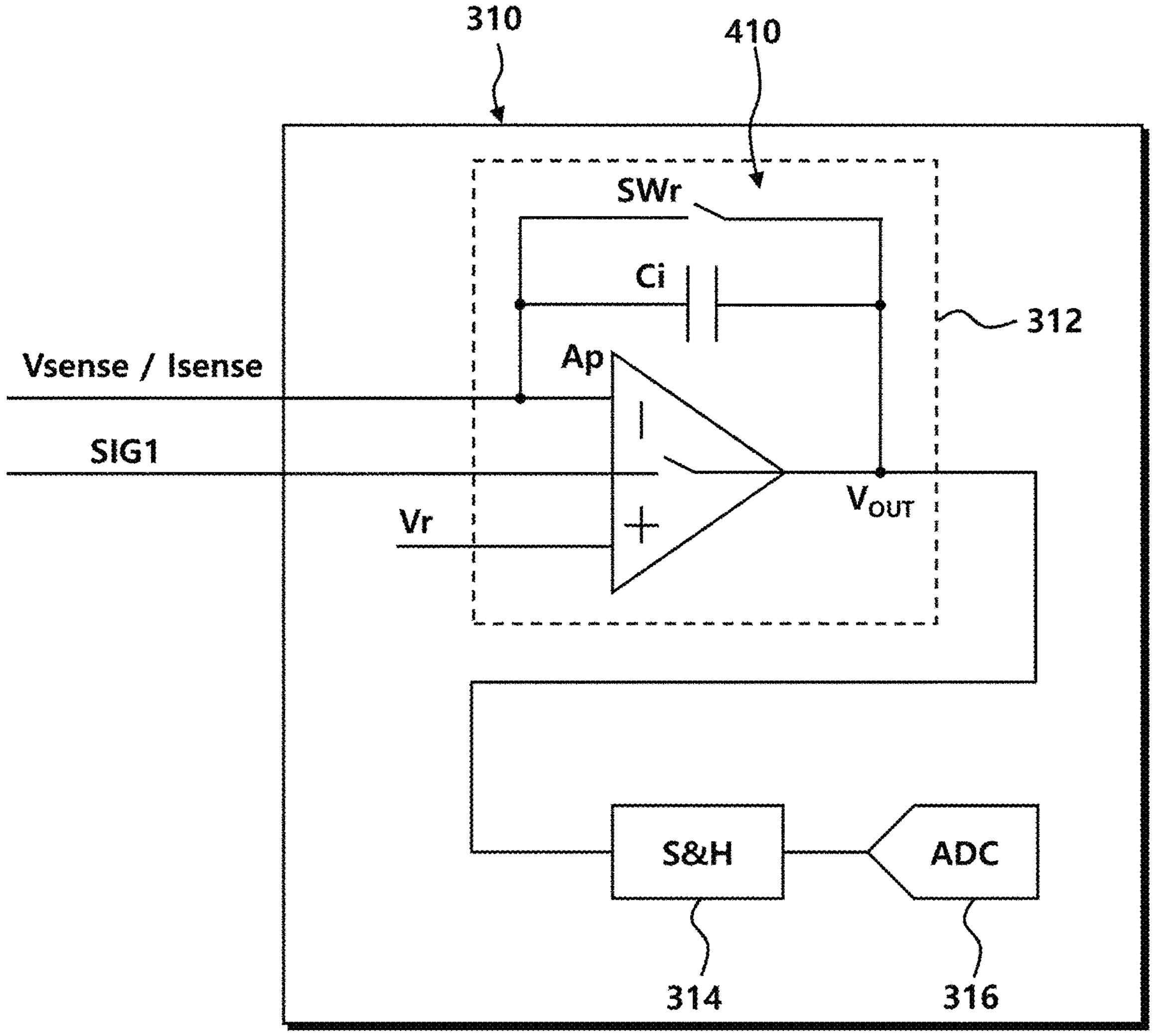
FIG. 4 is a diagram illustrating an internal configuration of the general pixel sensing circuit and a data processing circuit.

FIG. 4 is a diagram illustrating an internal configuration of the general pixel sensing circuit and the data processing circuit.

Referring to FIG. 4, the analog front end circuit 312 may include an integrator 410.

The analog front end circuit 312 may include the integrator 410. And, the integrator 410 may include an amplifier Ap, a capacitor Ci connected between one input terminal (e.g., a negative input terminal) and an output terminal of the amplifier Ap, and a reset switch SWr connected in parallel with the capacitor Ci, and the like.

The integrator 410 may integrate an analog signal (e.g., a pixel current Isense) from the pixel to output a sensing voltage Vout. The sensing voltage Vout may include a value obtained by integrating the pixel current Isense through the capacitor Ci of the integrator 410. The value integrated by the capacitor Ci may be reset by the reset switch SWr in advance before the next integration is performed.

The amplifier Ap of the integrator 410 may be driven by the first operation signal SIG1. The amplifier Ap may be turned off or on by the first operation signal SIG1. For example, the amplifier Ap may be turned off in a display section and then be turned on in a sensing section according to the first operation signal SIG1. The display section may be an operation section of the panel in which the pixels output image data. The sensing section may be an operation section of the panel in which the pixels are sensed. The amplifier Ap turned on in the sensing section may sense characteristics of the pixel (e.g., pixel current Isense).

Figure 5:
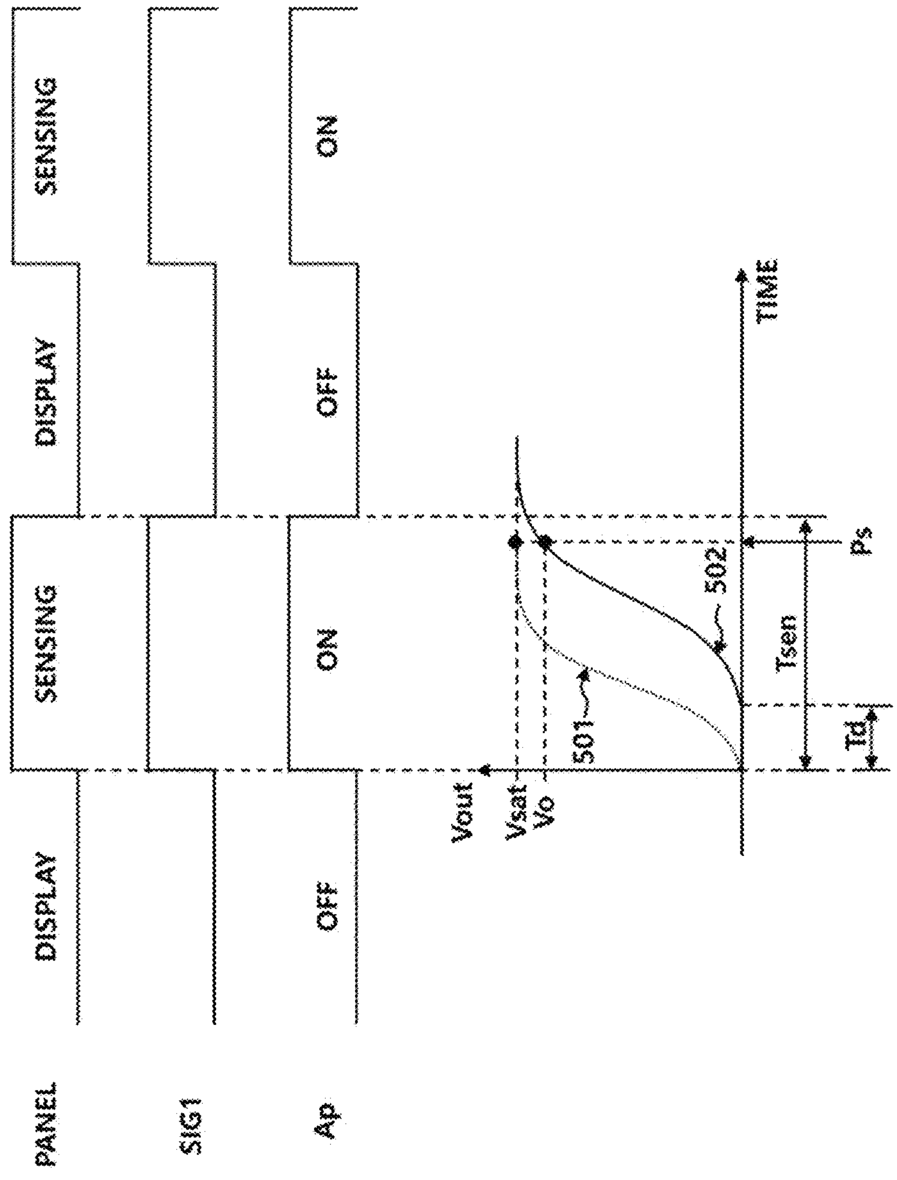
FIG. 5 is a diagram illustrating a sensing voltage waveform of the general pixel sensing circuit.

FIG. 5 is a diagram illustrating a sensing voltage waveform of the general pixel sensing circuit.

Referring to FIG. 5, a waveform of a sensing voltage Vout, output by the pixel sensing circuit 130 according to the panel operation section PANEL and the first operation signal SIG1, is illustrated.

The panel operation section (PANEL) may be classified according to the mode in which the panel operates, and may include a display section DISPLAY and a sensing section SENSING. The display section DISPLAY may be a time range in which the panel displays image data. The sensing section SENSING may be a time range in which characteristics of pixels are sensed. As the panel repeats displaying image data or sensing pixels in one frame, the display section DISPLAY and the sensing section SENSING may be repeated in the panel operation section PANEL.

The first operation signal SIG1 may drive the amplifier Ap in synchronization with the sensing section SENSING. The first operation signal SIG1 may be generated in the data processing circuit 150 and supplied to the amplifier Ap while being included in the data control signal DCS. The amplifier Ap may prepare for sensing pixels according to the first operation signal SIG1, which may mean that the amplifier Ap starts driving. Specifically, the amplifier Ap may be turned on according to the first operation signal SIG1.

For example, when the panel operation section PANEL is the display section DISPLAY, the first operation signal SIG1 may have a first level (e.g., a low level). The amplifier (Ap) may be turned off at the first level of the first operation signal SIG1. When the panel operation section PANEL is changed to the sensing section SENSING, the first operation signal SIG1 may be changed to a second level (e.g., a high level). The amplifier Ap may be turned on at the rising edge from the first level to the second level and may be turned on while the second level is maintained.

In addition, the first operation signal SIG1 may not drive the amplifier Ap in synchronization with the sensing section SENSING. The first operation signal SIG1 may be generated by the data processing circuit 150 and supplied to the amplifier Ap while being included in the data control signal DCS. The amplifier Ap may terminate sensing of the pixel according to the first operation signal SIG1, which may mean that the amplifier Ap stops driving. Specifically, the amplifier Ap may be turned off according to the first operation signal SIG1.

Meanwhile, after the amplifier Ap starts driving, the amplifier Ap may perform sensing according to the first operation signal SIG1 in the sensing section SENSING. Therefore, the amplifier Ap may output the sensing voltage Vout. The sensing voltage Vout is a value obtained by integrating the pixel current Isense by the amplifier Ap, and may be a voltage value formed at the output terminal of the amplifier Ap by the pixel current Isense accumulated in the capacitor Ci. Here, the amplifier Ap may be turned on in a period ON corresponding to the sensing section SENSING to sense pixels, and may be turned off in a period OFF corresponding to the display section DISPLAY.

The sensing voltage Vout output by the amplifier Ap may have a driving delay.

For example, ideally, when the amplifier Ap is turned on at the rising edge of the first operation signal SIG1, the sensing voltage Vout may be immediately output to reach a saturation voltage Vsat within a sensing time Tsen. Here, the sensing time Tsen may mean a period in which the amplifier Ap operates according to the first operation signal SIG1 corresponding to the sensing section SENSING of the panel. Such an ideal sensing voltage Vout output may be the same as a first curve 501 indicated by the dotted line in the sensing voltage Vout graph with respect to time TIME.

However, actually, when the amplifier Ap is turned on at the rising edge of the first operation signal SIG1, the output of the sensing voltage Vout is delayed by a driving delay time Td, and the sensing voltage Vout may not reach the saturation voltage Vsat within the sensing time Tsen. The sensing voltage Vout may reach the saturation voltage Vsat only after the sensing time Tsen has passed. Such an actual sensing voltage Vout output may be the same as a second curve 502 indicated by the solid line in the sensing voltage Vout graph with respect to time TIME.

In addition, the sensing voltage Vout output by the amplifier Ap may have an output delay. For example, the sensing voltage Vout of the amplifier Ap may reach the saturation voltage Vsat at a constant or different rate (amount of voltage change with respect to time). When the sensing voltage Vout is output at a different rate such as the first curve 501 and the second curve 502, the sensing voltage Vout may be output at a rapidly increased rate and then at a low ratio near the saturation voltage Vsat.

Accordingly, the driving delay may refer to the time from when the amplifier Ap is turned on until it starts sensing, whereas the output delay may refer to the time from when the output of the sensing voltage Vout starts until it reaches the saturation voltage Vsat. In addition, the driving delay may refer to the time delayed in the process in which the amplifier Ap prepares for sensing, whereas the output delay may refer to the time delayed in the process in which the amplifier Ap outputs the sensing voltage Vout after starting sensing.

Among these delays of the sensing voltage Vout, in particular, the driving delay may cause problems such as a lack of the sensing time Tsen of the amplifier Ap and an error in pixel sensing.

Due to the driving delay, the sensing time Tsen may be insufficient for the sensing voltage Vout to be output completely as the saturation voltage Vsat. Therefore, an additional operation time of the amplifier Ap may be required. As the additional operation time of the amplifier (Ap) is required, a proportion of the sensing section SENSING in one frame increases and a proportion of the display section DISPLAY decreases, which degrades image quality.

If the sensing section SENSING is not changed and the sensing voltage Vout is stabilized (before reaching the saturated voltage Vsat), the sensing data S_DATA may be generated based on a voltage of Vo. In this case, the sensing data S_DATA inevitably has an error. This is because the voltage of Vo, not the saturation voltage Vsat, is sampled at a time point of Ps when the sensing voltage Vout is sampled to generate the sensing data S_DATA, and the sensing data S_DATA is generated with the sampled voltage. Accordingly, it is necessary to expand the operation range of the amplifier Ap in other to sufficiently stabilize the output sensing voltage Vout of the amplifier Ap.

Figure 6:
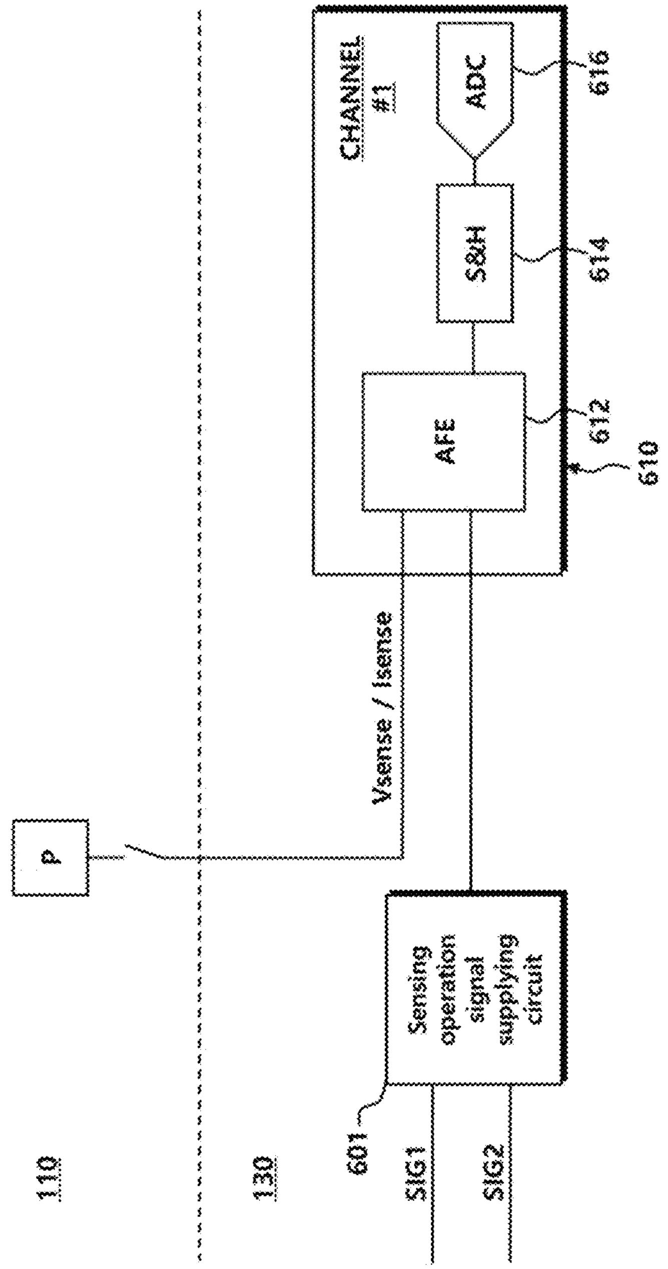
FIG. 6 is a block diagram of a pixel sensing circuit according to one embodiment.

FIG. 6 is a block diagram of a pixel sensing circuit according to one embodiment.

Referring to FIG. 6, the pixel sensing circuit 130 may additionally receive a signal for operating an amplifier of an analog front end circuit 612, thereby increasing an operation section of the amplifier. The pixel sensing circuit 130 may include an analog front end circuit 612, a sample and hold circuit 614, and an analog-to-digital converting circuit 616 in a channel circuit 610. In order to further receive an additional signal for the amplifier operation, the pixel sensing circuit 130 may further include a sensing operation signal supplying circuit 601.

The sensing operation signal supplying circuit 601 may receive a plurality of signals for driving the amplifier of the analog front end circuit 612, and supply the plurality of signals to the analog front end circuit 612.

For example, the sensing operation signal supplying circuit 601 may receive the first operation signal SIG1 and the second operation signal SIG2. The first operation signal SIG1 and the second operation signal SIG2 may drive the amplifier of the analog front end circuit 612. The amplifier of the analog front end circuit 612 may be turned on when receiving any one of the first operation signal SIG1 or the second operation signal SIG2.

The first operation signal SIG1 may be generated by the data processing circuit 150 and transmitted to the pixel sensing circuit 130 while being included in the data control signal DCS. The first operation signal SIG1 in the data control signal DCS may be transmitted to the sensing operation signal supplying circuit 601.

The second operation signal SIG2 may be generated by the data processing circuit 150 to be included in the data control signal DCS that controls the supply of the data voltage. The second operation signal SIG2 in the data control signal DCS may be transmitted to the sensing operation signal supplying circuit 601. Here, the data processing circuit 150 may generate the second operation signal SIG2 by time delaying the first operation signal SIG1.

In addition, the second operation signal SIG2 may be separately generated in the pixel sensing circuit 130 and may be a signal independent of the data control signal DCS. Here, the pixel sensing circuit 130 may generate the second operation signal SIG2 by time delaying the first operation signal SIG1.

The sensing operation signal supplying circuit 601 may supply one signal among a plurality of signals to the amplifier of the analog front end circuit 612 at different timings, and the amplifier may operate in a prescribed operation section according to the one signal.

For example, the sensing operation signal supplying circuit 601 may supply the first operation signal SIG1 to the analog front end circuit 612 to drive the amplifier. Furthermore, before supplying the first operation signal SIG1, the sensing operation signal supplying circuit 601 may supply the second operation signal SIG2 to the analog front end circuit 612 to drive the amplifier in advance. The amplifier of the analog front end circuit 612 may be previously driven according to the second operation signal SIG2 to prepare for pixel sensing. While the amplifier of the analog front end circuit 612 is turned on and operated according to the second operation signal SIG2, the amplifier of the analog front end circuit 612 may maintain the turn-on operation according to the first operation signal SIG1 when receiving the first operation signal SIG1.

The sample and hold circuit 614 may hold an output signal (e.g., a sensing voltage) of the analog front end circuit 612 for a predetermined time period. The sample and hold circuit 614 may output the held output signal to the analog-to-digital converting circuit 616 after the predetermined time period has elapsed.

The analog-to-digital converting circuit 616 may convert an output signal of the sample and hold circuit 614 into digital data.

Figure 7:
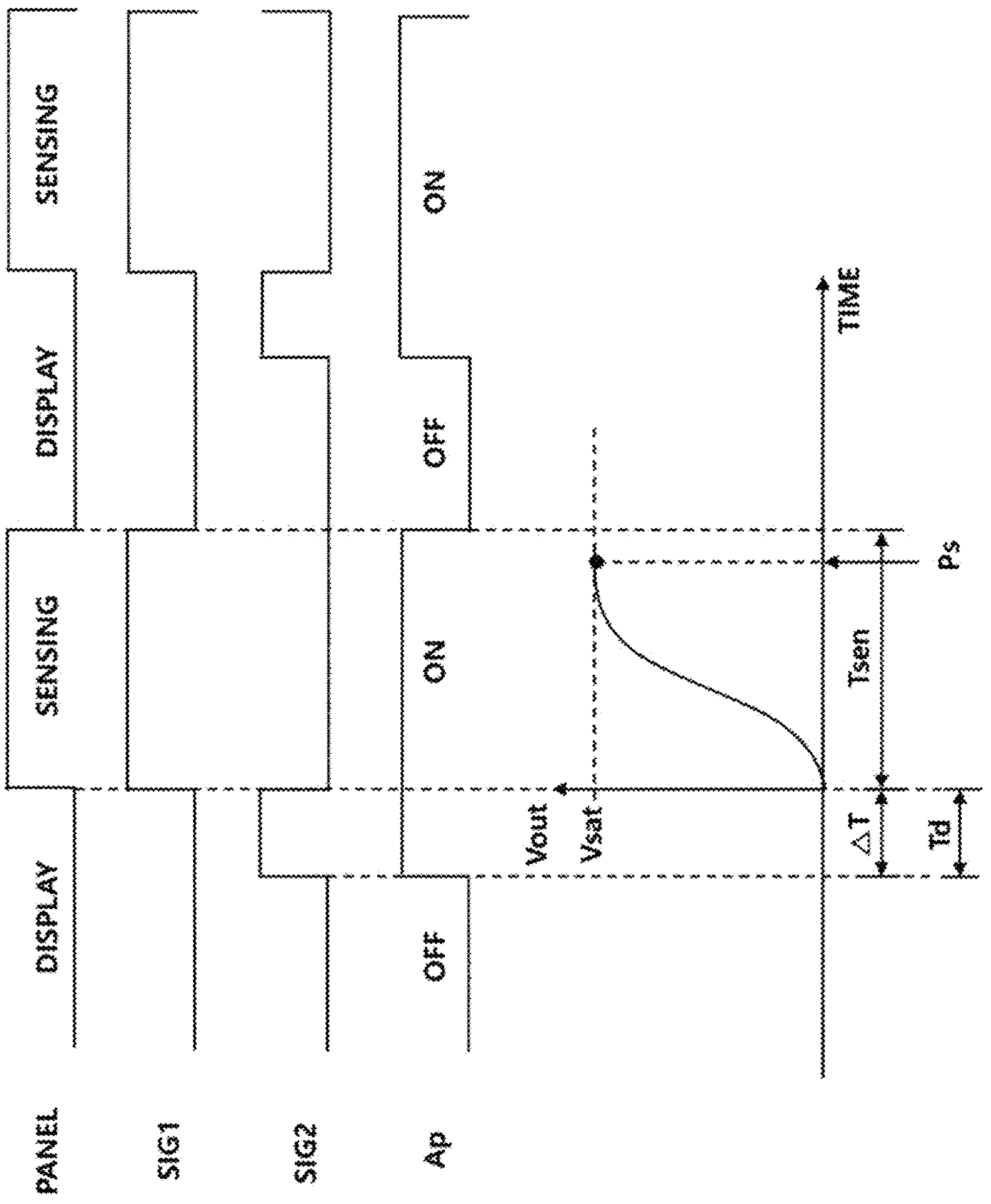
FIG. 7 is a diagram illustrating a sensing voltage waveform of the pixel sensing circuit according to one embodiment.

FIG. 7 is a diagram illustrating a sensing voltage waveform of the pixel sensing circuit according to one embodiment.

Referring to FIG. 7, a waveform of the sensing voltage Vout output by the pixel sensing circuit 130 according to the panel operation section PANEL and the first and second operation signals SIG1 and SIG2 is illustrated.

The first operation signal SIG1 may drive the amplifier Ap in synchronization with the sensing section SENSING. The amplifier Ap may be turned on or off according to the first operation signal SIG1. The sensing operation signal supplying circuit 601 (see FIG. 6) may receive the first operation signal SIG1 from the outside and transmit it to the amplifier Ap.

The second operation signal SIG2 may drive the amplifier Ap. The amplifier Ap may be turned on or off according to the second operation signal SIG2. The sensing operation signal supplying circuit 601 (see FIG. 6) may receive the second operation signal SIG2 from the outside and transmit it to the amplifier Ap.

The second operation signal SIG2 may be supplied to the amplifier Ap before the supply of the first operation signal SIG1. Accordingly, a trigger section in which the second operation signal SIG2 turns on the amplifier Ap (for example, the high level is maintained) may be ahead of a trigger section in which the first operation signal SIG1 turns on the amplifier Ap (for example, the high level is maintained).

When the first and second operation signals SIG1 and SIG2 are supplied to the amplifier Ap, the amplifier Ap may operate according to the first and second operation signals SIG1 and SIG2. The second operation signal SIG2 defines an additional operation range of the amplifier Ap, and the amplifier Ap may operate in the additional operation range in addition to the existing operation range.

For example, the amplifier Ap may be turned on at a rising edge at which the second operation signal SIG2 changes from a first level (e.g., a low level) to a second level (e.g., a high level). Here, the second operation signal SIG2 may be generated such that the second level is maintained until the rising edge of the first operation signal SIG1 appears. Alternatively, the second operation signal SIG2 may be generated such that the second level is maintained for a predetermined time after the rising edge of the first operation signal SIG1. The amplifier Ap may maintain the turn-on state while the second level of the second operation signal SIG2 is maintained. The amplifier Ap may be driven in advance to prepare for sensing according to the second operation signal SIG2.

Then, the amplifier Ap may continuously maintain the turn-on state while the second level of the first operation signal SIG1 is maintained. Even if the second operation signal SIG2 is changed to the first level, the amplifier Ap may be continuously driven according to the first operation signal SIG1. The amplifier Ap may perform a full-scale sensing according to the first operation signal SIG1.

At the same time, when the amplifier Ap receives the first operation signal SIG1, the channel circuit 610 in FIG. 6 including the amplifier Ap may be connected to the pixel to receive the characteristics of the pixel, for example, the pixel current Isense. The amplifier Ap may be connected to the pixel in a sensing section SENSING corresponding to the first operation signal SIG1. And, the amplifier Ap may start pixel sensing by starting integrating the pixel current Isense.

As the second operation signal SIG2 is additionally supplied to the amplifier Ap, the sensing time Tsen of the amplifier Ap may increase by a time ΔT during which the second level of the second operation signal SIG2 is maintained. Accordingly, the amplifier Ap may maintain the turn-on state for a time period including the existing sensing time Tsen and the additional sensing time ΔT.

The additional sensing time ΔT may mean an extra time for covering the driving delay of the amplifier Ap. Therefore, it may be preferable that the additional sensing time ΔT is at least greater than the driving delay. The amplifier Ap may be driven in advance for the additional sensing time ΔT to complete preparation for pixel sensing, and may stably output the sensing voltage Vout with an output delay during the existing sensing time Tsen.

In order to supply the second operation signal SIG2 to the amplifier Ap before the sensing time Tsen corresponding to the sensing section SENSING, the second operation signal SIG2 needs to be supplied to the amplifier Ap in the display section DISPLAY in which the pixel outputs image data. Accordingly, the second operation signal SIG2 may be supplied to the amplifier Ap when the panel is in the display section DISPLAY. That is, the second operation signal SIG2 may be supplied to the amplifier Ap in synchronization with a partial section or the entire section of the display section DISPLAY. Accordingly, the amplifier Ap may be driven from a time point earlier than the starting point of the sensing section SENSING by a time corresponding to the partial section or the entire section.

The amplifier Ap may stabilize and output the sensing voltage Vout within the sensing section SENSING, and transmit the output sensing voltage Vout to the sample and hold circuit 614 (see FIG. 6). For example, when the amplifier Ap receives the second operation signal SIG2, the amplifier Ap may be turned on to start driving at the additional sensing time ΔT. When receiving the first operation signal SIG1, the amplifier Ap may start to output the sensing-sensing voltage Vout. When the amplifier Ap enters the sensing time Tsen corresponding to the sensing section SENSING, the amplifier Ap may gradually output the sensing voltage Vout and allow the sensing voltage Vout to reach the saturation voltage Vsat within the sensing time Tsen. The amplifier Ap can output the saturated (stable) sensing voltage Vout within the sensing time Tsen.

By additionally supplying the second operation signal SIG2 to the amplifier Ap, the problem of insufficient sensing time Tsen and pixel sensing error can be solved.

The second operation signal SIG2 may turn on the amplifier Ap in advance before the sensing section SENSING and may provide the amplifier Ap with an additional sensing time ΔT necessary for driving delay. The additional sensing time ΔT may mean a time added to compensate for the driving delay of the sensing voltage Vout. Since the additional sensing time ΔT prevents the driving delay of the amplifier Ap from sacrificing the sensing time Tsen, the sensing time Tsen can be a sufficient time required for stable output of the sensing voltage Vout. By assigning an additional operation section to the amplifier Ap, the sensing section SENSING corresponding to the sensing time Tsen does not need to be artificially increased and the display section DISPLAY can be maintained as it is. Therefore, there is no concern of image quality degradation.

In addition, the stabilized sensing voltage (saturated voltage Vsat) can be sampled at the sampling time Ps of the sensing voltage Vout. Sensing data can be generated from the sampled voltage by the analog-to-digital converting circuit 616 in FIG. 6. As a result, the error of the sensing data can be reduced.

Figure 8:
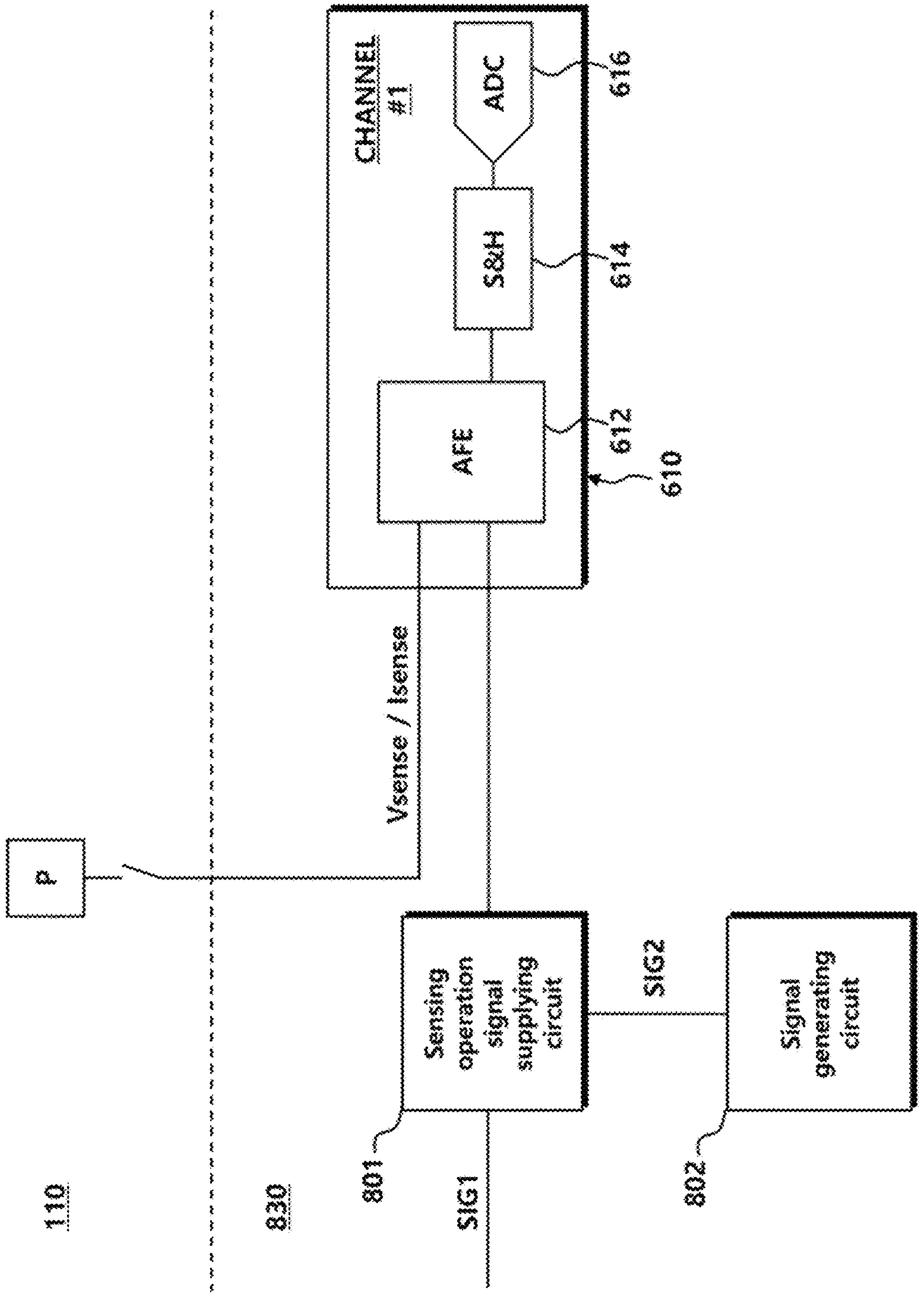
FIG. 8 is a block diagram of a pixel sensing circuit according to another embodiment.

FIG. 8 is a block diagram of a pixel sensing circuit according to another embodiment.

Referring to FIG. 8, the pixel sensing circuit 830 may generate an additional signal for operating the amplifier of the analog front end circuit 312. The additional signal may be a signal input from the outside, but the pixel sensing circuit 830 itself may generate the additional signal as shown in FIG. 8. To this end, the pixel sensing circuit 830 may further include a signal generating circuit 802.

The signal generating circuit 802 may generate the second operation signal SIG2 and transmit it to the sensing operation signal supplying circuit 801. The second operation signal SIG2 generated by the signal generating circuit 802 may drive the amplifier Ap like the first operation signal SIG1.

The signal generating circuit 802 may process the first operation signal SIG1 to generate the second operation signal SIG2. The signal generating circuit 802 may generate the second operation signal SIG2 by time delaying the first operation signal SIG1. For example, the signal generating circuit 802 may adjust the pulse width and timing of the first operation signal SIG1 to generate the second operation signal SIG2 with a pulse width and a different timing from those of the first operation signal SIG1.

The sensing operation signal supplying circuit 801 may receive the second operation signal SIG2 from the signal generating circuit 802 and transmit it to the analog front end circuit 612.

Meanwhile, the signal generating circuit 802 may generate the second operation signal SIG2 with different signal characteristics depending on the operation range of the amplifier of the analog front end circuit 612. For example, the signal generating circuit 802 may generate the second operation signal SIG2 with a pulse width proportional to the additional sensing time $\Delta T$. When the additional operation range of the amplifier (e.g., the additional sensing time $\Delta T$ in FIG. 7) is long, the signal generating circuit 802 may widen the pulse width of the second operation signal SIG2 to correspond to the additional operation range.

Since terms such as "include", "construct", or "have" as described above mean that corresponding elements may exist unless otherwise stated, it should be construed as being able to further include other components not to exclude other components. All terms including technical or scientific terms have the same meaning as those generally understood by those skilled in the art to which the present disclosure belongs unless otherwise defined. The commonly used terms, such as those defined in the dictionary, should be interpreted as being consistent with the meaning of the context of the related art, and should not be interpreted in an ideal or excessively formal meaning unless explicitly defined in the present disclosure.

Since the technical idea of the present disclosure has been merely described for illustrative purposes, various modifications and variations may be made without departing from the essential features of the present disclosure by those of ordinary skill in the art to which the present disclosure pertains. Therefore, the embodiments disclosed in the present disclosure are intended not to limit but to explain the technical idea of the present disclosure, so the scope of the technical idea of the present disclosure is not limited to those embodiments. The protection scope of the present disclosure should be construed by the following claims, and all the technical ideas within the scope equivalent thereto should be construed as being included in the scope of the present disclosure.

What is claimed is:

1. A circuit for sensing characteristics of a pixel disposed on a display panel, comprising:

an integrator for integrating a current of the pixel and configured to receive a first operation signal in a sensing section of the display panel and a second operation signal in a display section of the display panel, a sample and hold circuit configured to hold an output signal of the integrator, and an analog-to-digital converting (ADC) circuit configured to convert an output signal of the sample and hold circuit into digital data, wherein, when the integrator receives the first operation signal in the sensing section of the display panel, the integrator integrates a current of the pixel in an operation section set by the first operation signal, and wherein, when the integrator receives the second operation signal in the display section of the display panel before receiving the first operation signal, the integrator starts operating in a preliminary operation section set by the second operation signal.

2. The circuit of claim 1, wherein the second operation signal sets the preliminary operation section at a preceding time of the operation section by the first operation signal and the integrator starts operating in the preliminary operation section by the second operation signal.

3. The circuit of claim 2, wherein the integrator outputs a voltage corresponding to characteristics of a pixel, and the voltage is saturated to a predetermined voltage in the operation section by the first operation signal.

4. The circuit of claim 3, wherein the voltage is delayed and output over the operation section by the first operation signal and the preliminary operation section by the second operation signal.

5. The circuit of claim 1, wherein the operation section by the first operation signal is set to correspond to the sensing section in which the pixel is sensed.

6. The circuit of claim 1, wherein the preliminary operation section by the second operation signal is set to correspond to a part of the display section in which the pixel outputs image data.

7. The circuit of claim 1, wherein the first operation signal and the second operation signal are included in a data control signal that is generated by a data processing circuit and controls the supply of a data voltage to the pixel.

8. The circuit of claim 1, wherein the first operation signal is included in a data control signal that is generated by a data processing circuit and controls the supply of a data voltage to the pixel, and the second operation signal is generated independently of the data control signal.

9. The circuit of claim 1, wherein the integrator comprises an amplifier which is turned on when receiving the second operation signal and maintained in a turn-on state during the operation section by the first operation signal and the preliminary operation section by the second operation signal.

10. A display driving integrated circuit comprising:

a data driving circuit which supplies a data voltage to a data line connected to a pixel in a display section, a frame divided into the display section and a sensing section; and a pixel sensing circuit which senses characteristics of the pixel in the sensing section, wherein the pixel sensing circuit comprises an integrator for integrating a current of the pixel and configured to receive a first operation signal in the sensing section and a second operation signal in the display section, a sample and hold circuit configured to hold an output signal of the integrator, and an analog-to-digital converting (ADC) circuit configured to convert an output signal of the sample and hold circuit into digital data, and wherein the pixel sensing circuit starts operating for a sensing by receiving the second operation signal in the display section at a time point earlier than a start time point of the sensing section set by the first operation signal in the sensing section.

11. The display driving integrated circuit of claim 10, wherein the pixel sensing circuit starts driving one internal circuit according to the second operation signal indicating the time point earlier by a predetermined time.

12. The display driving integrated circuit of claim 11, wherein the pixel sensing circuit comprises in the one internal circuit one amplifier and starts driving the one amplifier according to the second operation signal.

13. The display driving integrated circuit of claim 11, wherein the pixel sensing circuit starts driving the one internal circuit according to the second operation signal wherein the one internal circuit is connected with the pixel in the sensing section according to the first operation signal.

14. The display driving integrated circuit of claim 10, wherein the second operation signal is generated according to a time delay of the first operation signal.

15. The display driving integrated circuit of claim 10, wherein the pixel sensing circuit converts a sensing value of the pixel saturated in the sensing section into sensing data and outputs the sensing data, and the data driving circuit receives image data compensated according to the sensing data, converts the image data into the data voltage, and supplies the data voltage to the data line.

* * * * *